(12) United States Patent
Sumroy

(10) Patent No.: US 11,241,983 B2
(45) Date of Patent: Feb. 8, 2022

(54) CHILD RESTRAINT SYSTEM FOR AN INFANT

(71) Applicant: CARFOLDIO LTD., Raanana (IL)

(72) Inventor: Jon Sumroy, Raanana (IL)

(73) Assignee: CARFOLDIO LTD., Raanana (IL)

( * ) Notice: Subject to any disclaimer, the term of this patent is extended or adjusted under 35 U.S.C. 154(b) by 0 days.

(21) Appl. No.: 16/971,447

(22) PCT Filed: Feb. 21, 2018

(86) PCT No.: PCT/IL2018/050201
§ 371 (c)(1),
(2) Date: Aug. 20, 2020

(87) PCT Pub. No.: WO2019/162931
PCT Pub. Date: Aug. 29, 2019

(65) Prior Publication Data
US 2020/0398710 A1 Dec. 24, 2020

(51) Int. Cl.
*B60N 2/28* (2006.01)
*A47D 1/10* (2006.01)
*A47D 15/00* (2006.01)

(52) U.S. Cl.
CPC ........... *B60N 2/286* (2013.01); *B60N 2/2845* (2013.01); *B60N 2/2863* (2013.01); *A47D 1/10* (2013.01);
(Continued)

(58) Field of Classification Search
CPC ........ A47D 1/10; A47D 1/103; A47D 15/006; B60N 2002/2896
See application file for complete search history.

(56) References Cited

U.S. PATENT DOCUMENTS

| 2,960,149 | A | * | 11/1960 | Throssel | ................ | A47D 1/103 |
|---|---|---|---|---|---|---|
| | | | | | | 297/440.12 |
| 3,054,637 | A | * | 9/1962 | Pambello | ............... | B60N 2/286 |
| | | | | | | 297/4 |

(Continued)

FOREIGN PATENT DOCUMENTS

| IL | 60915 | 10/1980 |
|---|---|---|
| RU | 69815 U1 | 1/2008 |

(Continued)

OTHER PUBLICATIONS

PCT International Search Report for International Application No. PCT/IL2018/050201, dated May 24, 2018, 4pp.

(Continued)

*Primary Examiner* — Syed A Islam
(74) *Attorney, Agent, or Firm* — The Roy Gross Law Firm, LLC; Roy Gross

(57) ABSTRACT

A child restraint system for securely carrying an infant in a vehicle, said child restraint system comprising a rigid shell that is concave of an inner side and which may be attached to a seat of a vehicle, to provide a unitary element that serves as both seat and back for supporting the infant, and a harness for holding the infant within the concave side of the shell; the unitary element comprising two parts that are hinged together so that the shell folds along a center line running through the rigid shell, each part comprising at least two panels, such that each panel is attachable to adjacent panels to form the rigid shell, or disconnectable from the adjacent panels so that the child restraint system is compactable into a substantially flattened configuration for storage.

20 Claims, 4 Drawing Sheets

(52) U.S. Cl.
CPC ............ *A47D 1/103* (2013.01); *A47D 15/006* (2013.01); *B60N 2/2881* (2013.01); *B60N 2/2887* (2013.01); *B60N 2002/2815* (2013.01); *B60N 2002/2896* (2013.01)

(56) References Cited

U.S. PATENT DOCUMENTS

| | | | | |
|---|---|---|---|---|
| 4,457,032 | A * | 7/1984 | Clarke | B60N 2/60 297/219.1 |
| 5,366,271 | A * | 11/1994 | Johnston | B60N 2/286 297/250.1 |
| 5,785,383 | A * | 7/1998 | Otero | A47D 1/02 297/255 |
| 6,685,266 | B2 | 2/2004 | James et al. | |
| 7,222,917 | B2 * | 5/2007 | Ward | B60N 2/2881 297/219.1 |
| 7,810,682 | B2 * | 10/2010 | Balensiefer | B60N 2/2806 224/158 |
| 7,934,772 | B2 * | 5/2011 | Van der Vegt | B60N 2/2875 297/256.1 |
| 8,152,231 | B2 * | 4/2012 | Larsen | B60N 2/307 297/42 |
| 9,376,088 | B2 | 6/2016 | Sumroy | |
| D788,478 | S | 6/2017 | Sumroy et al. | |
| 10,575,658 | B2 * | 3/2020 | Romero | A47D 1/10 |
| 10,856,670 | B2 * | 12/2020 | Gooris | A47D 15/006 |
| 2004/0061366 | A1 | 4/2004 | Meeker et al. | |
| 2007/0145789 | A1 * | 6/2007 | Linero | B64D 11/0693 297/107 |
| 2008/0018152 | A1 * | 1/2008 | Vadai | B60N 2/286 297/255 |
| 2014/0101859 | A1 * | 4/2014 | Testa | A47D 1/02 5/655 |
| 2016/0347211 | A1 * | 12/2016 | Dobson | B60N 2/2881 |

FOREIGN PATENT DOCUMENTS

| | | |
|---|---|---|
| RU | 128163 U1 | 5/2013 |
| WO | 2016202289 A1 | 12/2016 |
| WO | 2018173029 A1 | 9/2018 |

OTHER PUBLICATIONS

PCT Written Opinion for International Application No. PCT/IL2018/050201, dated May 24, 2018, 5pp.

PCT International Preliminary Report on Patentability for International Application No. PCT/IL2018/050201, completed Feb. 24, 2020, 6pp.

* cited by examiner

CHILD RESTRAINT SYSTEM FOR AN INFANT

CROSS REFERENCE TO RELATED APPLICATIONS

This application is a National Phase of PCT Patent Application No. PCT/IL2018/050201 having International filing date of Feb. 21, 2018, the contents of which is incorporated by reference as if fully set forth herein in its entirety.

BACKGROUND

Many jurisdictions advise, and a growing number require, that child passengers in vehicles use specially designed child restraints. The range of such systems includes separate child-sized seats equipped with their own integrated harnesses and booster cushions or seats for use by children together with the adult seat belt that is installed in the vehicle by the manufacturers. In some jurisdictions children below a certain size are forbidden to travel in front car seats.

Child restraint systems (sometimes referred to as infant safety seats, child safety seats, child seats, restraint car seats, or ambiguously as car seats) are designed specifically to protect children from injury or death during collisions. Automobile manufacturers may integrate child restraint systems directly into their vehicle's design. However, most commonly, such child restraint systems are purchased and installed by parents. Many regions require children of certain ages, weights, and/or heights to use a government-approved child restraint system when riding in a vehicle.

Child restraint systems provide passive restraint in case of collision, and must be properly used to be effective. However, many child restraint systems are not used properly.

Infant car seats are legally required in many countries, including the United States, to safely transport children from birth up to the age of approximately four years old in cars and other vehicles. Although typically age ranges are used, these are really a rough guide, and the classification of child restraint systems is usually based on a weight and/or height range which also dictates the appropriate solution for a particular child.

Booster seats are recommended for children that are too big for infant car seats, until they are big enough to properly use an adult seat belt without them. Some jurisdictions require booster seats to be used by law. Booster seats raise the child and allow the seat belt to sit firmly across the collar bone and chest, with the lap portion fitted to the hips. If the seat belt is not correctly positioned across the collar bone and the hips, it will generally ride across the neck or face and the stomach and cause internal injuries in the event of a collision. In addition to raising the child to a height where the seatbelt operates effectively, booster seats also facilitate the child seeing out of the window. Since the child is more comfortable and has better vision, they are generally accepted by younger children. In the United States, booster seats are required by law up to the age of 9 or a weight of 90 pounds (41 Kg). Unfortunately, booster seats are generally large and bulky devices. Where a back seat of a vehicle is sometimes used to transport adult passengers and sometimes for transporting children, the booster seat has to be removed and replaced. Booster seats are space consuming and their storage in the trunk of a vehicle minimizes the amount of groceries or other goods that can be transported. When left on the seats, they effectively occupy the seat, even when empty, and prevent the transportation of adult passengers. Booster seats are an additional expense for grandparents and other occasional drivers of children such as when car-pooling. When renting cars, booster seats may need to be rented separately which is an additional expense that patents may be tempted to avoid. For these and similar reasons, booster seats are often not available when required.

Older children may still need a child restraint system by law, but may consider booster seats as being babyish. Indeed, shorter adults may be too short to be correctly restrained by adult seatbelts.

U.S. Pat. No. 9,376,088 to Sumroy titled "Apparatus for Adapting a Seatbelt for a Child" addresses the problem of traditional booster seats being bulky and therefore not used when they should be, and reviews various collapsible solutions of the prior art. The patent describes and claims a radically different approach to the problem, by safely bringing down and adapting the adult seat-belt to the child, rather than by raising the child into the adult seatbelt. A revolutionary commercial product based on this concept is shown in the registered design U.S. Pat. No. D788,478 (S) "Folding child's car seat" to Sumroy, known as the Mifold™, which has won international design awards and is a great commercial success.

Babies and younger children, such as those up to the age of four, henceforth infants, require child restraint systems that are appropriate to them. Child restraint systems designed for infants tend to be even bulkier than booster seats, and a baby or infant seat will usually occupy a passenger seat even when empty, preventing parents from taking a full quota of older children when taking a carpool rota with other parents, even when the infant is not in the vehicle. Where such car seats for babies and infants are removed from the adult seat and are stowed in the storage compartment of the vehicle, they take up a lot of space and limit the amount of other goods such as luggage or groceries that can be transported.

Younger children require a child seat with a back and head rest, and PCT/IL2017/050343 to Sumroy also titled "Apparatus for Adapting a Seatbelt for a Child" describes various solutions for adjusting the adult three-point seatbelt to a child and discloses a folding, collapsible car seat. IL 60915 is a design application for such a product.

In many jurisdictions, baby seats or baskets that hold a baby securely, usually with a three or five point harness, are required for transporting babies in vehicles.

Because of the space taken up by child restraint systems, and the need to be able to carry a full complement of adult passengers and their luggage, taxi services may be exempted from the rules requiring baby seats and child seats. Indeed, passengers on coaches, in taxis and on buses may not be required to wear seatbelts. However, regardless of the skills of even the most professional driver, collisions can occur due to the poor driving of a vehicle crashing into the one carrying a child. In cases of collision, the unsecured child is at a similar risk, whether traveling in a private vehicle or a commercial taxi. Even where the vehicle has a strong, impact resistant cage, a child who is not properly retrained may be flung out of the seat and into or through the windscreen or rear window.

The widespread use of minicabs and services such as Uber™, where regular vehicles are used to provide a commercial taxi service, and the drivers are not required to undergo advanced training and may not be particularly experienced, clearly exasperates this problem. Where not obliged to carry special children's seats, the taxi driver generally will generally not do so, due to the space requirements, and it is impractical to expect a taxi driver to carry a number of bulky child restraint systems for adequately restraining passengers of all sizes, it being noted that sometimes a family will require more than one seat of the same type. If a taxi is provided with a number of conventional child restraint systems, it will not be able to take adults and their baggage.

Despite the plethora of developments in safety harnesses and boosters, there remains a need for child restraint systems that are suitable for new-born babies and infants up to the age of four, that may be configured into a shape or size that is more convenient for stowing. Embodiments of the present invention address this need.

BRIEF SUMMARY

A first aspect of the invention is directed to a child restraint system for securely carrying an infant in a vehicle, said child restraint system comprising a rigid shell that is concave of an inner side and which may be attached to a seat of a car, to provide a unitary element that serves as both seat and back for supporting the infant, and a harness for holding the infant within the concave side of the shell; the unitary element comprising two parts that are hinged together so that the shell folds along a center line running through the rigid shell, each part comprising at least two panels, such that each panel is attachable to adjacent panels to form the rigid shell, or disconnectable from the adjacent panels so that the child restraint system is compactable into a substantially flattened configuration for storage.

By infant, a child between the ages of 0 (new born) and four years is intended.

In some embodiments, the shell folds horizontally so that the back folds down onto the seat.

In other embodiments, the shell folds laterally bringing outer edges of left and right parts into proximity.

Typically the panels comprise rigid expanded polymer foam. Preferably the rigid expanded polymer foam components have a stiff outer skin.

Typically, each panel has at least one edge which is non-linear and which abuts a corresponding non-linear edge of an adjacent panel.

Typically locking means are provided for securing the first and second components together so that the shell is locked into its first configuration.

Optionally, said locking means comprises a pair of interlocking components mounted on surfaces of adjacent panels that abut when said baby carrier is in its assembled configuration, such that one of each pair of interlocking components is attached to one of each pair of abutting panels. In some embodiments, the interlocking elements comprise a male part that is insertably engaged by a female part.

In some embodiments, the hinge along the center line is formed from a single sheet of material.

Optionally, the hinge along the center line comprises a flexible single sheet of polymeric material.

Optionally the flexible single sheet of polymeric material is embedded into the panel.

Optionally the flexible hinge comprises polypropylene which further comprises said outer skin.

In preferred embodiments, the child restraint system is configured for alternatively attaching to a seat of a car in a rear facing or a forward-facing configuration with the convex side facing either forwards or backwards respectively.

Typically, the baby carrier further comprises means for engaging a three-point seatbelt for holding said baby carrier to a car seat.

Preferably, the baby carrier further comprises a pair of tethers for engaging a pair of tether points integral to the vehicle.

Optionally the pair of tethers are flexible.

Alternatively the pair of tethers are rigid bars.

In some embodiments, the pair of tethers and tether points comprise Isofix™ or iSize™ fixings.

Preferably the pair of tethers may be selectively configured in either a forward facing or a backward facing configuration for engaging a pair of tether points such that tethered seat is selectively forwards or backwards facing.

Optionally, the baby carrier comprises a base that is hingedly coupled to at least one panel for folding with the panels to compact said seat.

Optionally the baby carrier further comprises a handle that enables comfortably holding by one hand the carrier with a baby strapped therein.

BRIEF DESCRIPTION OF FIGURES

For a better understanding of the invention and to show how it may be carried into effect, reference will now be made, purely by way of example, to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice.

In the accompanying drawings.

DESCRIPTION OF EMBODIMENTS

Figure 1:
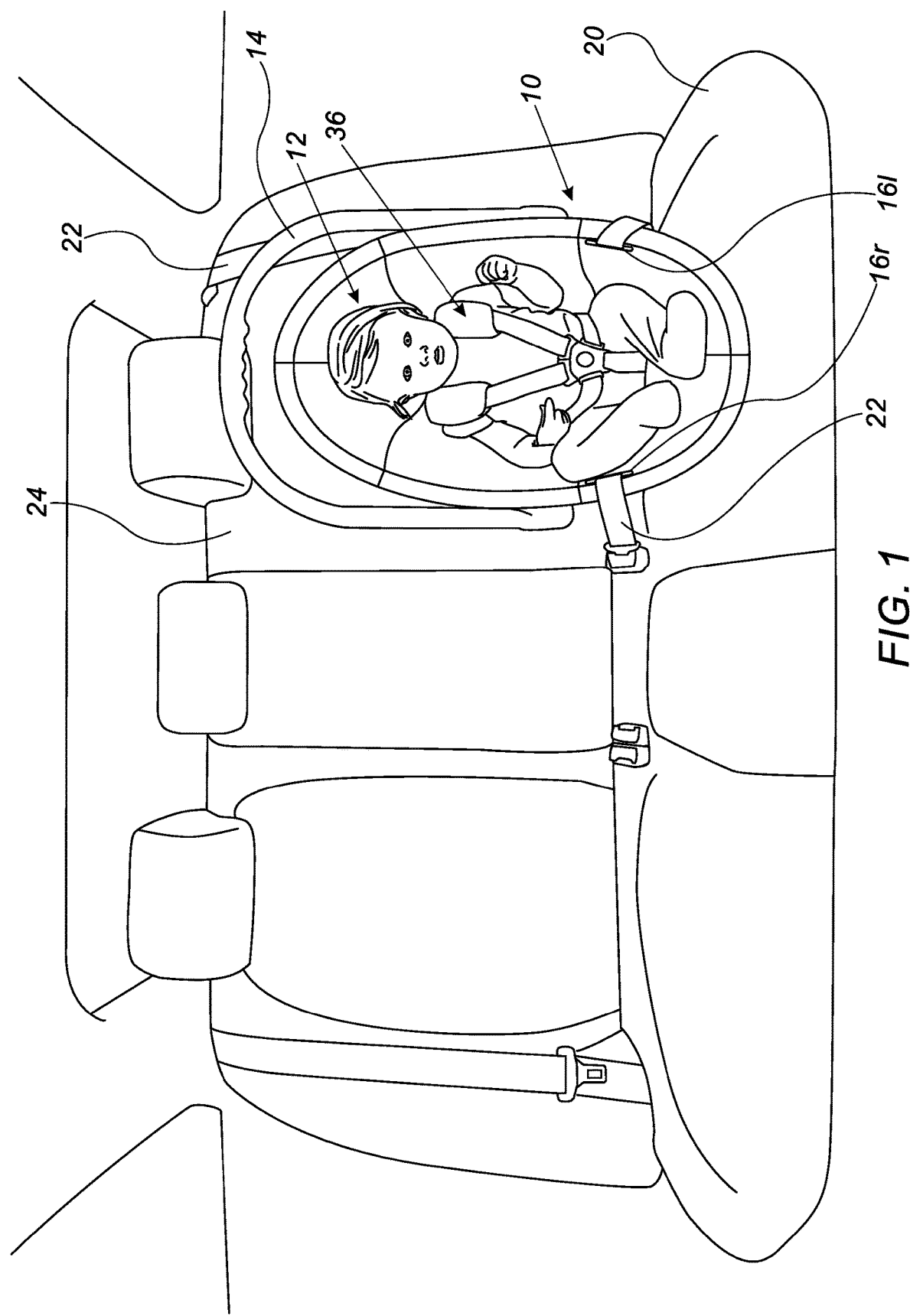
FIG. 1 is a schematic illustration of an infant within a child restraint system for an infant that is attached to a car seat by a three-point seatbelt, wherein the infant is strapped into the child restraint system by a 5-point harness.

With reference to FIG. 1, a first embodiment is directed to a child restraint system 10 for an infant 12 that may be positioned on a car seat 20 and attached thereto, by the three point seat belt 22 that is designed for primarily for securely restraining adults. A handle 14 that is optionally provided for carrying the child restraint system 10 is folded back above the child restraint system 10 and close to the back 24 of the car seat 20. The seat belt 22 is threaded through a pair of slits 16L, 16R in the child restraint system 10.

By infant 12, a child from birth to about aged four is intended. Strictly speaking the appropriate child restraint system is a function of the size or weight of the child, rather than age, and more formally, the child restraint system of the invention is appropriate for infants up to a weight of 15 Kg (40 lb).

Figure 2:
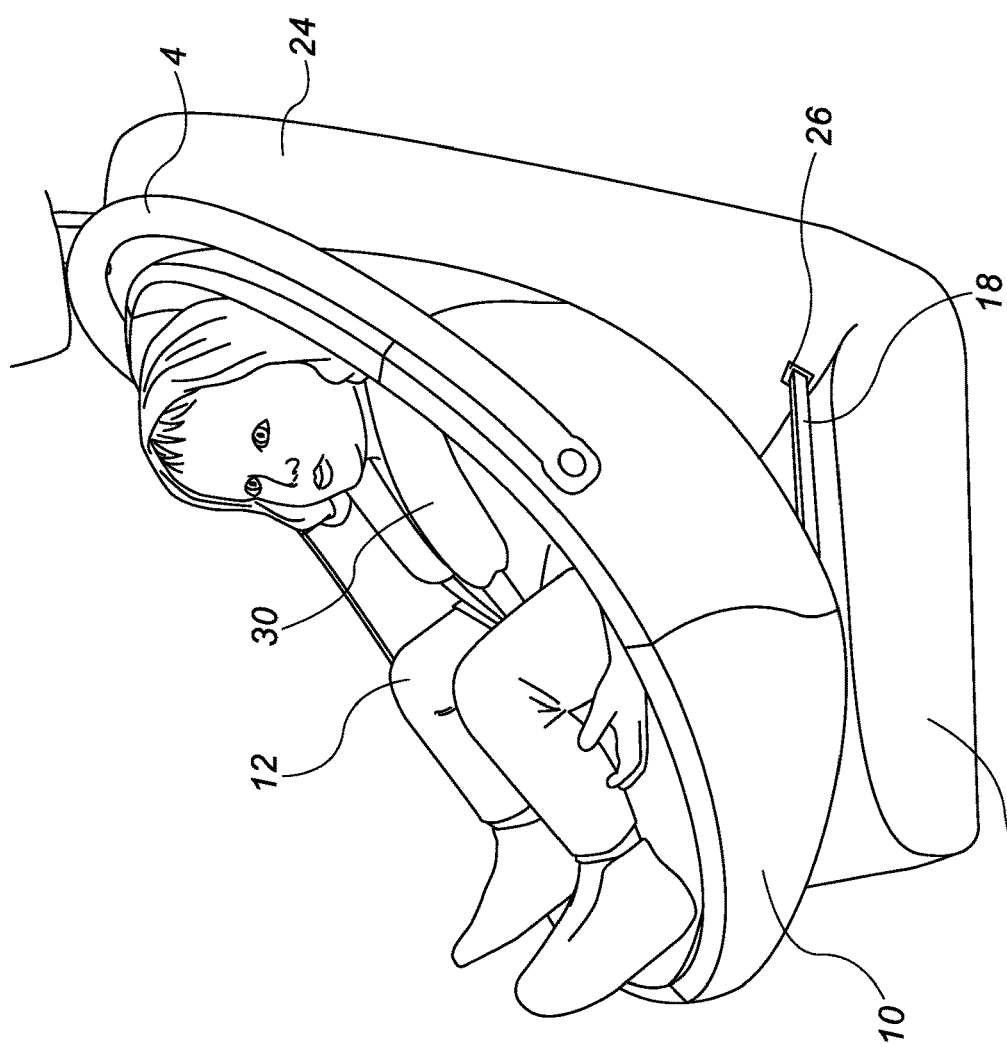
FIG. 2 is a side view of a child restraint system for an infant attached to a car seat by a pair of tether bars.

FIG. 2 is a side view of a child restraint system 10 resting on a seat 20. In FIG. 2, the child restraint system 10 is coupled to the car seat by standard tethers 18 that engage fixed tether points 26 attached to the frame of the vehicle at the base of the seat. Such tethers include tether bars (required in Europe) and flexible tether straps which are considered adequate in the United States. There tethers may be part of standard systems such as Isofix™ or iSize™. Many modern cars come equipped with such Isofix™ or iSize™ tether points 26 as standard, and these provide an alternative, rigid and secure coupling means.

Figure 3:
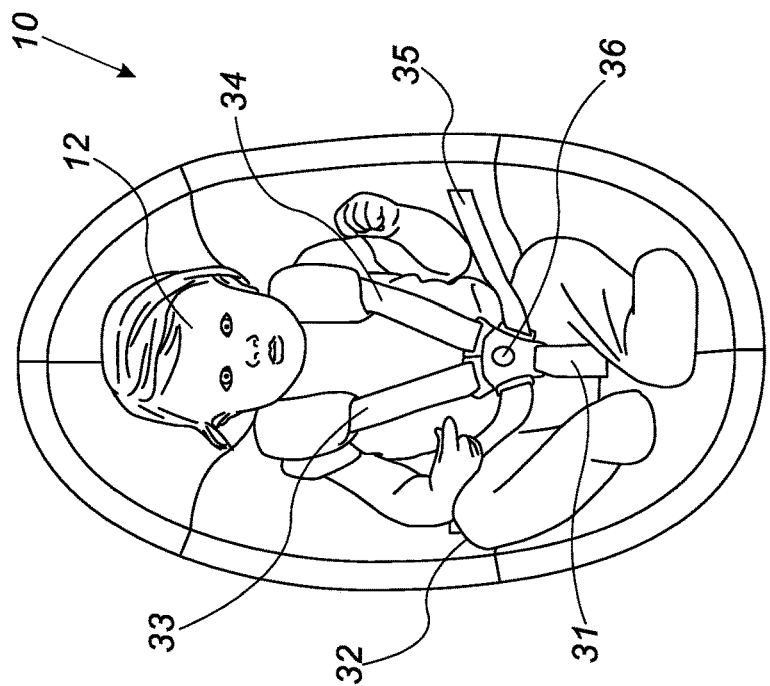
FIG. 3 is a schematic illustration of an infant strapped into a child restraint system for an infant by a five-point seat belt.

With reference to FIG. 3, the infant 12 is strapped into the child restraint system 10 with a harness that is preferably a five point harness 30 that has a central strap that goes between the legs of the infant 12, side straps 32 and 35 that pass over the legs of the infant 10 and shoulder straps that come down over the shoulders of the infant 10. The straps are typically fabricated from woven nylon and all five straps meet at a clasp 36 that can be opened with one hand. Preferably the position of the shoulder straps is adjustable to comfortably and securely restrain infants of different sizes from new born babies to children aged four. Five-point restraining harnesses 30 with a single central clasp 36 are common to child restraint systems carriers and require no further explanation.

Figure 4:
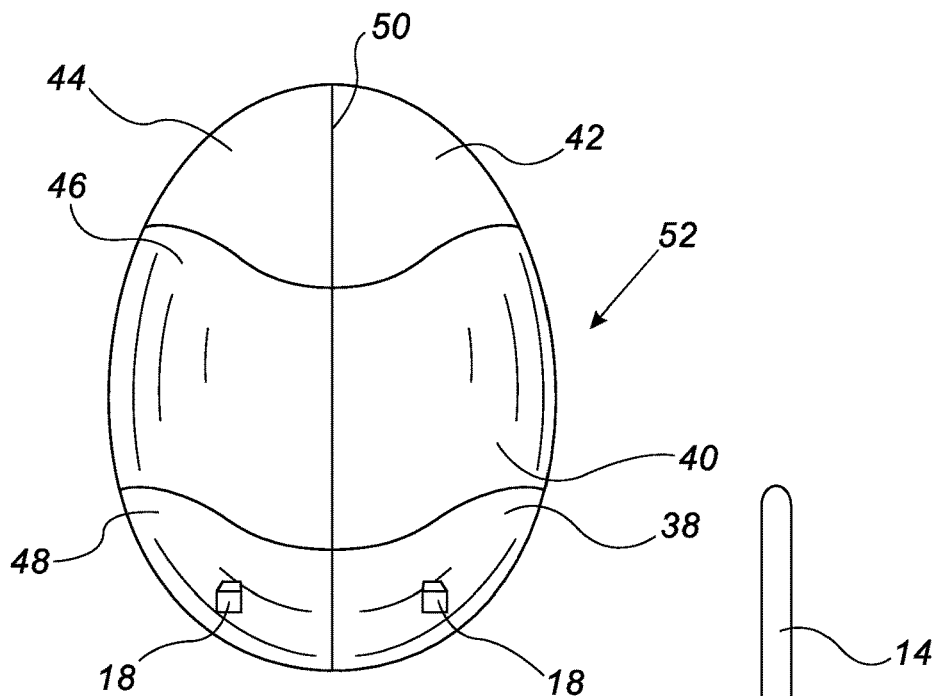
FIG. 4 is a rear view of one embodiment of a child restraint system for an infant showing how it is constructed from a plurality of panels.
Figure 5:
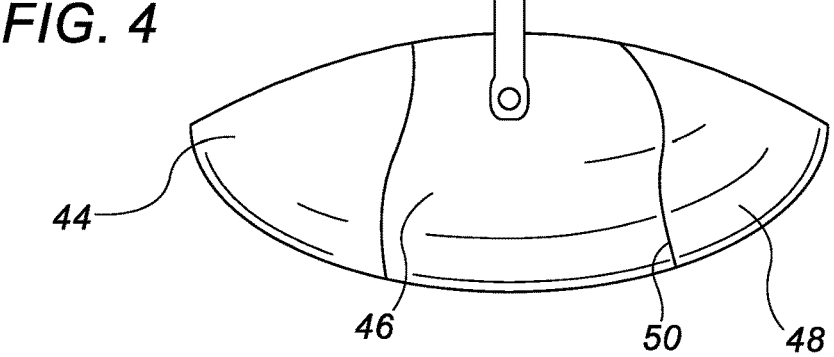
FIG. 5 is a side view of the non folded child restraint system.
Figure 6:
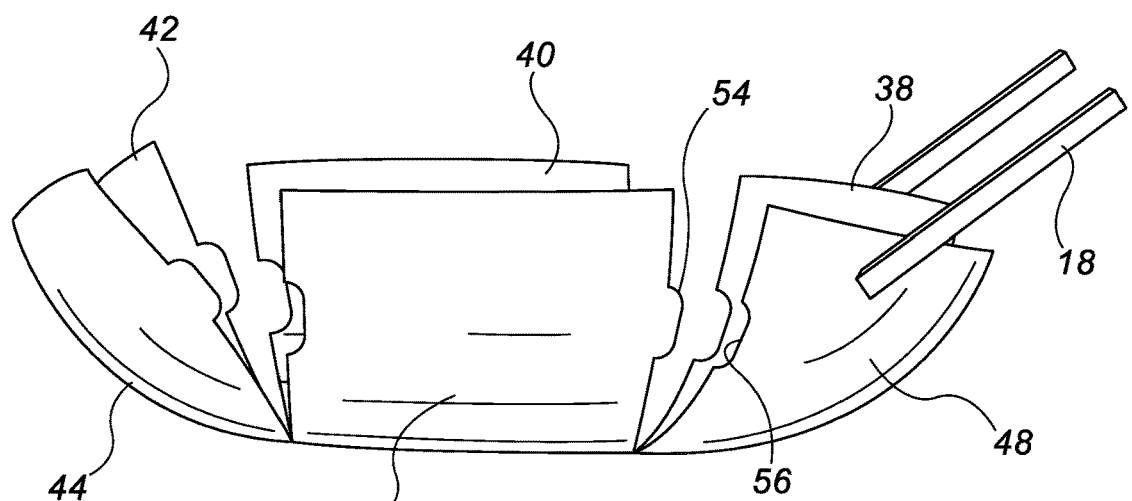
FIG. 6 is a side view of a child restraint system for an infant configured collapsed so that the left and right sides are brought into contact.

With reference to FIG. 4, the reverse side of the child restraint system 10 is shown. In addition to the five point harness 30 and the handle 14 (not shown in FIG. 4 the child restraint system 10 consists of a shell 52 that is constructed from a plurality of panels 38, 40, 42, 44, 46, 48. In FIG. 5, the child restraint system 10 is shown from the side, and in FIG. 6 the child restraint system 10 is shown from the side in its unfold configuration, where the panels 38, 40, 42, 44, 46 and 48 are disengaged, enabling the shell of the infant seat 10 to fold laterally about an axis of symmetry 50.

In the embodiment shown, the shell 52 consists of six panels, but other embodiments may have more or less panels. The panels meet at and are hinged together at a lateral line 50. The edges of adjacent panels 46, 48 are provided with coupling means 54, 56 that enable them to be locked together to provide the rigid shell 52 shown in FIGS. 4 and 6, or uncoupled to enable the shell 52 of the child restraint system 10 be folded flat. The coupling means may consist of interlocking protrusions and sockets on the mating surfaces, which could resemble the protrusions and sockets of a jigsaw puzzle or hooks and eyes, tongue and groove or may be dovetail-like. What is important is that the design of the interlocking parts should be secure and the weight of an infant 12 pressing down on the panels 38-46 should help to keep the parts interlocked, whereas without an infant 12 in the child restraint system 10, the panels 38-46 of baby carrier 10 should be easily disconnected from the adjacent panels, other than along the central hinge. The handle 14 is optional. It should be able to be clicked into the configuration shown in FIG. 6 so that the handle does not move with respect to the shell part of the child restraint system 10. Usefully, the handle folds into two to ease folding of the baby carrier 10 for stowage.

Figure 7:
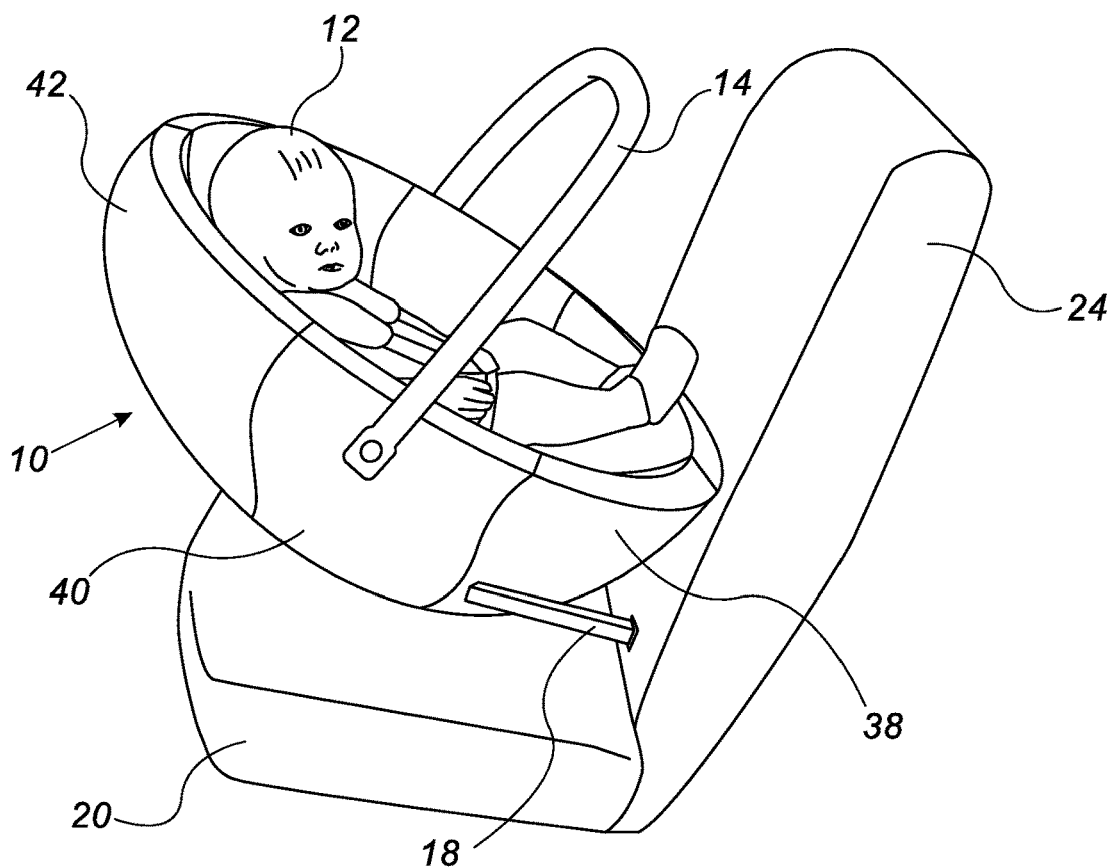
FIG. 7 is a side view of a child restraint system for an infant attached to a car seat such that the infant therein is facing backwards.

As shown in FIG. 7, in preferred embodiments, the tethers 18, such as Isofix™ or iSize™ tethers, can be repositioned to enable the child restraint system 10 to be connected facing backwards. This is probably a safer position for the infant in case of impact, and is particularly appropriate for babies, and enables a passenger in an adjacent seat to play with the baby. Older infants generally prefer to sit facing forwards as shown in FIGS. 1 and 2, to be able to see outwards.

Figure 8:
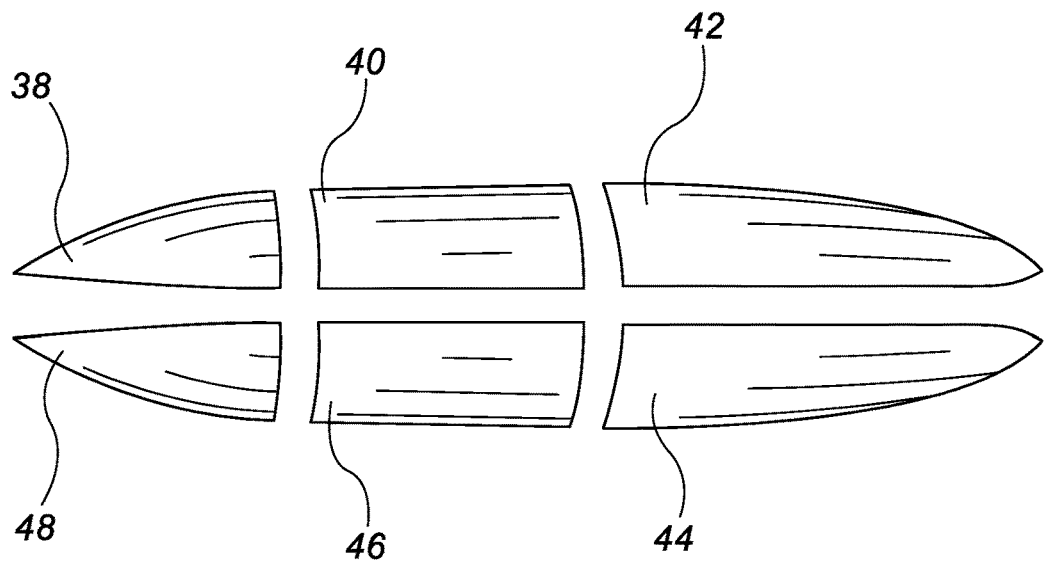
FIG. 8 is a side view of a child restraint system for an infant that is folded flat for stowage.

FIG. 8 shows the child restraint system 10 folded down about the hinge, so that the outer edges of the right and left sides are brought together for stowage.

In other embodiments, the child restraint system 10 folds horizontally instead of laterally, so that the back folds towards the seat. The skin covering the outer surface of the child restraint system 10 may be fabricated from one piece of polyethylene and the hinge 50 may be a fold in the piece of polyethylene.

Thus persons skilled in the art will appreciate that the present invention is not limited to what has been particularly shown and described hereinabove. Rather the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A child restraint system for securely carrying an infant in a vehicle, said child restraint system comprising
   a rigid shell that is concave of an inner side and which may be attached to a seat of a vehicle, to provide a unitary element that serves as both seat and back for supporting the infant and a harness for holding the infant within the concave side of the shell;
   wherein the unitary element comprises two parts that are hinged together laterally so that the shell folds along a center line running laterally through the rigid shell bringing outer edge of left and right parts into proximity, each part comprising at least two panels, such that each panel is attachable to adjacent panels to form the rigid shell, or disconnectable from the adjacent panels so that the child restraint system is compactable into a substantially flattened configuration for storage.

2. The child restraint system of claim 1 wherein the panels comprise rigid expanded polymer foam.

3. The child restraint system of claim 2 wherein the rigid expanded polymer foam components have a stiff outer skin.

4. The child restraint system of claim 2 wherein each panel has at least one edge which is non-linear and which abuts a corresponding non-linear edge of an adjacent panel.

5. The child restraint system of claim 1 wherein locking means are provided for securing the first and second components together so that the shell is locked into its first configuration.

6. The child restraint system of claim 5 wherein said locking means comprise a pair of interlocking components mounted on surfaces of adjacent panels that abut when said baby carrier is in its assembled configuration, such that one of each pair of interlocking components is attached to one of each pair of abutting panels.

7. The child restraint system of claim 6 wherein the interlocking components comprise a male part that is insertably engaged by a female part.

8. The child restraint system of claim 1 wherein the hinge along the center line is formed from a single sheet of material.

9. The child restraint system of claim 1 wherein the hinge along the center line comprises a flexible single sheet of polymeric material.

10. The child restraint system of claim 9 wherein the flexible single sheet of polymeric material is embedded into the panels.

11. The child restraint system of claim 9 wherein the hinge comprises polypropylene which further comprises a stiff outer skin.

12. The child restraint system of claim 1 being configurable for alternatively attaching to a seat of a car in a rear facing or a forward facing configuration with the convex side facing either forwards or backwards.

13. The child restraint system of claim 1 further comprises slits configured to engage a three point seatbelt for holding said baby carrier to a car seat.

14. The child restraint system of claim 1 further comprising a pair of tethers for engaging a pair of tether points integral to the vehicle.

15. The child restraint system of claim 14 wherein the pair of tethers are flexible.

16. The child restraint system of claim 14 wherein the pair of tethers comprise rigid bars.

17. The child restraint system of claim 14 wherein the pair of tethers and tether points comprise latch fixings.

18. The child restraint system of claim 14 wherein the pair of tethers may be selectively configured in either a forward facing or a backward facing configuration for engaging a pair of tether points such that tethered seat is selectively forwards or backwards facing.

19. The child restraint system of claim 1 further comprising a base that is hingedly coupleable to at least one panel for folding with the panels to compact said seat.

20. The child restraint system of claim 1 further comprising a handle that enables comfortably holding by one hand the carrier with a baby strapped therein.

* * * * *